Aug. 16, 1927.
A. FOUNTAIN ET AL
1,639,173
REFLANGING TOOL
Filed June 1, 1926
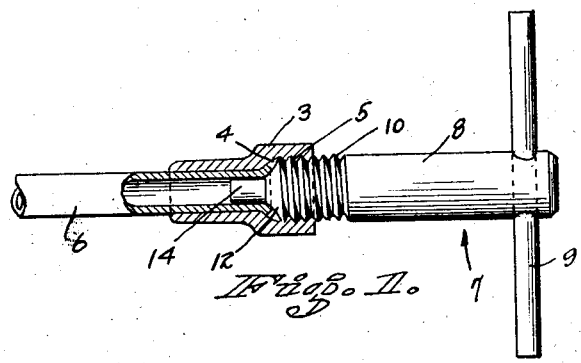
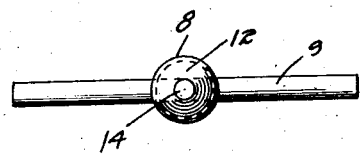
Inventor
ADOLPH FOUNTAIN
FELICE BALZARINI
THEODORE THIEL
By
Attorneys.

Patented Aug. 16, 1927.

1,639,173

UNITED STATES PATENT OFFICE.

ADOLPH FOUNTAIN, FELICE BALZARINI, AND THEODORE THIEL, OF SAN FRANCISCO, CALIFORNIA.

REFLANGING TOOL.

Application filed June 1, 1926. Serial No. 112,943.

This invention relates to reflanging tools and it has for one of its objects the provision of an efficient, economical, and simple reflanging tool.

With the foregoing object in view, together with such other objects and advantages as may subsequently appear, this invention resides in the construction and arrangement of parts hereinafter described and claimed, and illustrated in the accompanying drawings, in which—

Fig. 1 is a plan view of the tool partly in section, showing also a pipe partly in section which is to be flanged; and Fig. 2 is an end view of Fig. 1, looking toward the left.

Referring to the drawings for more detailed descriptions thereof, the reflanging tool comprises a tubular member 3 provided with a tapered seat 4, and having internal threads 5 to the right of the tapered seat.

The pipe 6 is to have a flange formed on an end thereof and for that purpose is inserted into the tubular member 3 until its end portion extends to the right extremity of the seat 4.

A member 7 comprises a shank 8, provided at its outer end with a transverse handle 9. The member 7 further comprises a threaded portion 10 which engages the interior threads 5 of the member 3. Adjacent the left end of the member 7, the latter has a tapered portion 12, and to the left of this tapered portion there is a cylindrical portion 14 which is part of the member 7, and is adapted to enter the tube 6.

In the operation of the device with the tube 6 disposed in the member 3, as herein before described, and held in a vise, or any other suitable means, the turning of the member 7 clockwise when the element 3 is held from turning, is effective to cause the tapered portion 12 to make a flare or flange on the end of the pipe 6, the flare assuming the shape of the seat 4 of the member 3. The member 7 may then be withdrawn and a pipe may be inserted in its place, whereupon the substituted pipe is joined to the pipe 6 by means of the element 3 which functions as a union.

It will be readily seen that the pipe 6 will be securely held to the member 3 by the flange formed on the pipe 6.

While we have described one embodiment of our invention, modifications thereof may be readily devised without departing from the spirit of our invention, and it is to be understood that such modifications come within the scope of the appended claims.

We claim:—

1. A reflanging tool comprising a first unsplit tubular threaded member and a second member having threads engaging the threads on the first member, said first member having a seat therein, said second member extending into the bore of said first member and having a part adapted to flare the end of a tube inserted into said first member over said seat and thereby bind the former to the latter.

2. A reflanging tool comprising a first unsplit tubular threaded member and a second member having threads engaging the threads on the first member, said first member having a seat therein, said second member extending into the bore of said first member and having a part adapted to flare the end of a tube inserted into said first member over said seat and thereby bind the former to the latter, the threads on said first and second members being respectively female and male.

3. A reflanging tool comprising a first unsplit tubular threaded member and a second member having threads engaging the threads on the first member, said first member having a seat therein, said second member extending into the bore of said first member and having a part adapted to flare the end of a tube inserted into said first member over said seat and thereby bind the former to the latter, said second member having an end portion adapted to enter the inserted tube.

4. A reflanging tool comprising a first unsplit tubular threaded member and a second member having threads engaging the threads on the first member, said first member having a seat therein, said second member extending into the bore of said first member and having a part adapted to flare the end of a tube inserted into said first member over said seat and thereby bind the former to the latter, the threads on said first and second members being respectively female and male, said second member having an end portion adapted to enter the inserted tube.

ADOLPH FOUNTAIN.
FELICE BALZARINI.
THEODORE THIEL.